Mar. 27, 1923.

1,449,528

W. P. MATTHEWS

LAND LEVELER AND SCRAPER

Filed July 18, 1921  2 sheets-sheet 1

INVENTOR.
W. P. MATTHEWS.
by Frank Waterfield
ATTORNEY.

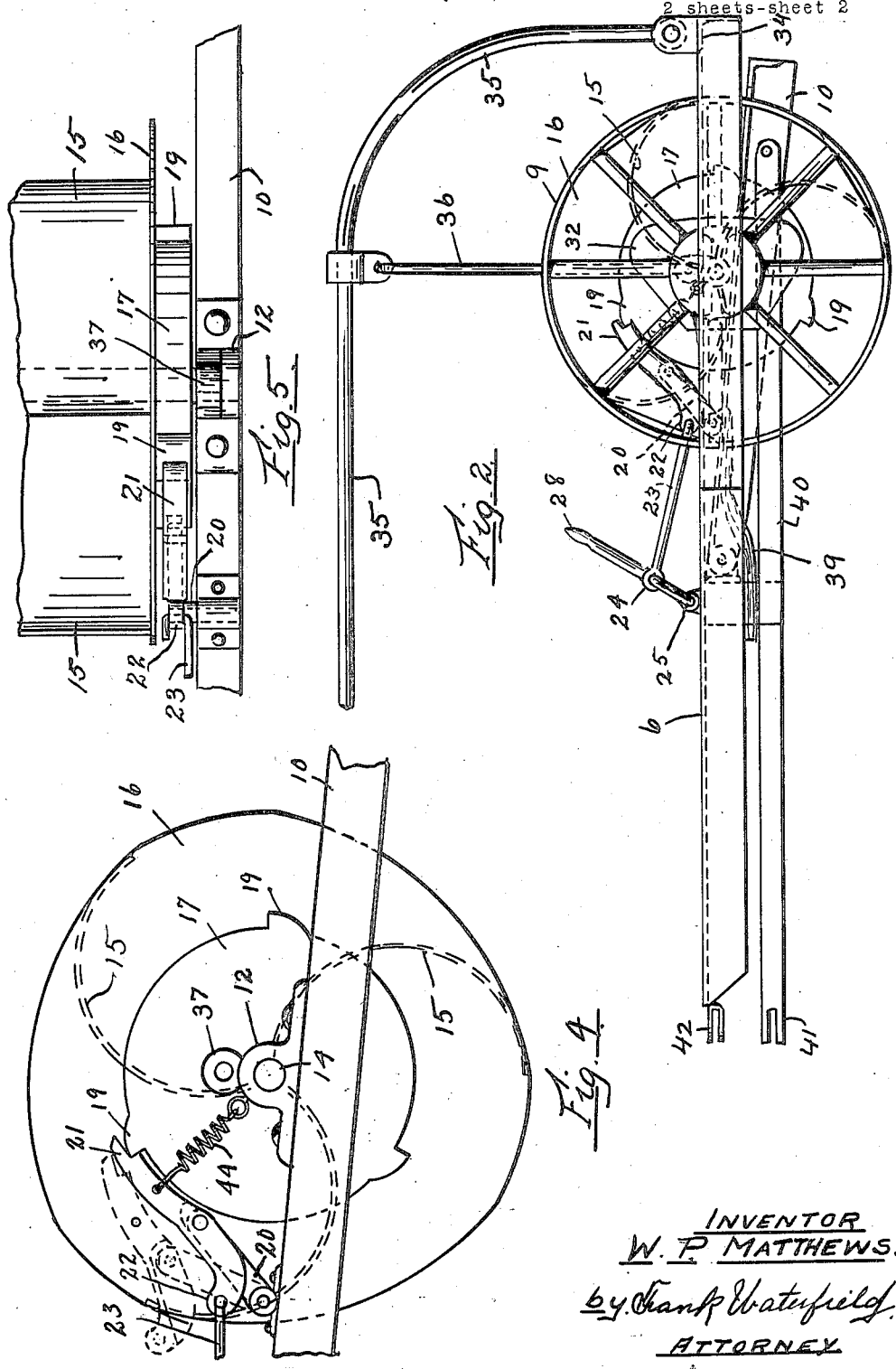

Patented Mar. 27, 1923.

1,449,528

UNITED STATES PATENT OFFICE.

WILLIAM P. MATTHEWS, OF SAN JOAQUIN, CALIFORNIA.

LAND LEVELER AND SCRAPER.

Application filed July 18, 1921. Serial No. 485,755.

*To all whom it may concern:*

Be it known that I, WILLIAM P. MATTHEWS, a citizen of the United States, and resident of San Joaquin, in the county of Fresno, State of California, have invented certain new and useful Improvements in Land Levelers and Scrapers, of which the following is a specification.

My invention relates primarily to a land leveler or scraper for use in leveling large tracts of land for agricultural purposes, constructing irrigating ditches and the like and the object thereof is to provide means whereby the time and labor required is reduced to the minimum thereby greatly increasing the efficiency and earning power thereof.

Other objects and advantages will appear hereinafter and while I have shown and will describe the preferred form of my invention it will be understood that I do not limit myself to such preferred form, but that various changes and adaptations may be made therein without departing from the spirit of my invention.

In the drawings accompanying and forming a part hereof:

Fig. 2, is a side elevation of Fig. 1, on a slightly larger scale.

Figs. 4 and 5 are enlarged details of the prime features of my invention.

Figures 1, 3:
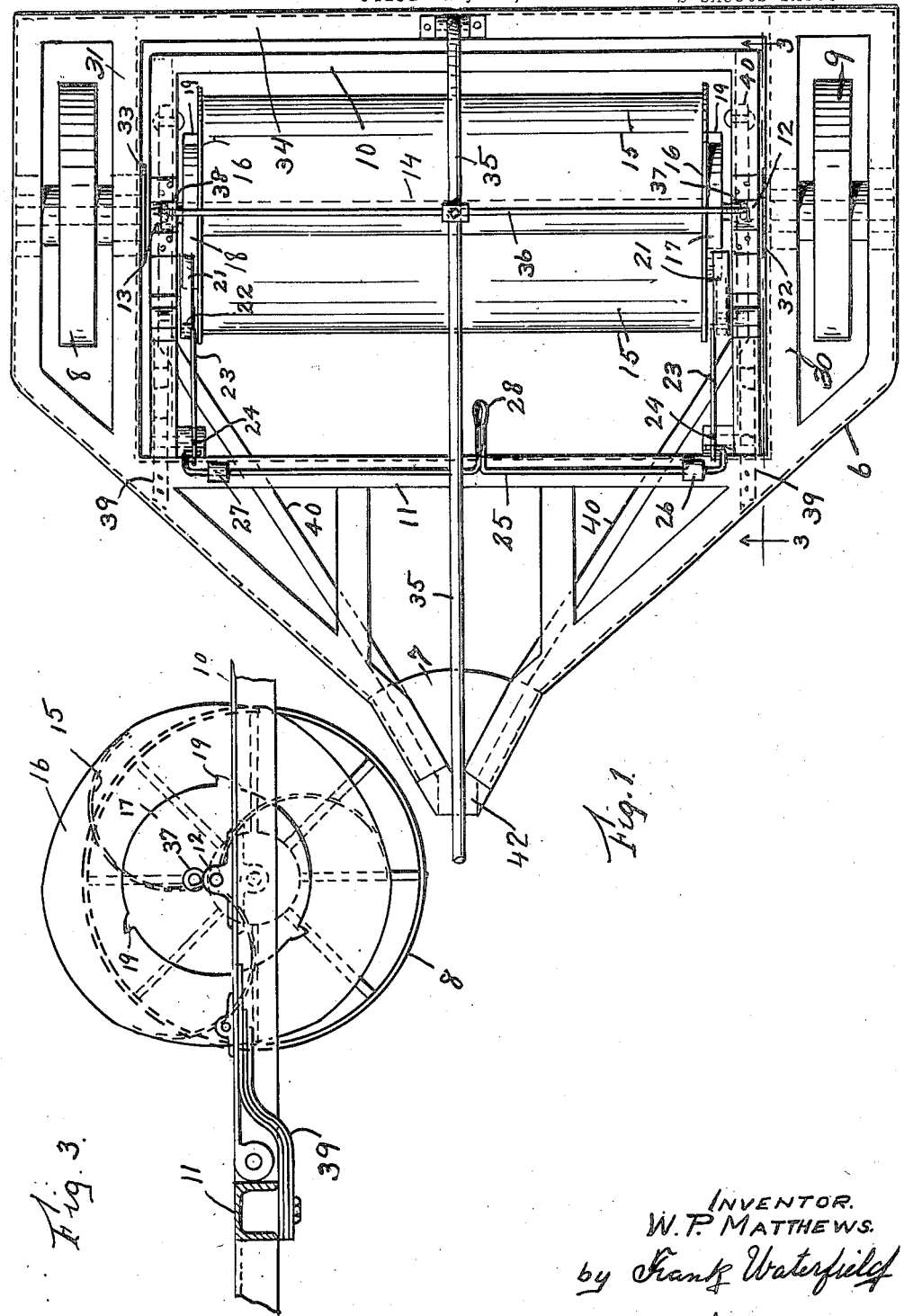
Fig. 1, is a top plan of my invention ready for use.
Fig. 3, is a section on the line 3—3 of Fig. 1.

Referring to the drawings my device comprises a substantially rectangular frame 6, the front end of which tapers inwardly and forwardly and terminates in a guide member 7. Revolubly mounted at each end of said frame 6 are wheels 8 and 9 which support said frame at a predetermined distance from the ground. Mounted within frame 6 is a substantially U-shaped frame 10 pivotally connected at its free ends to cross member 11 of frame 6, and revolubly mounted at its ends in bearings 12 and 13 secured to the upper side of the sides of said frame 10 is a shaft 14 upon which are mounted the scraper blades 15. Blades 15 are, in cross section, semi-circular in shape and are secured at their inner edges to shaft 14 at equal distances apart and have their ends connected together and supported by substantially circular discs 16 as best shown in Figs. 1 and 5. While I have shown three of these blades 15 I wish it understood that I reserve the right to use more or less as desired or as may become necessary. Secured to discs 16 on the outer sides thereof and concentric with shaft 14 are holding drums 17 and 18 provided on the periphery thereof with teeth or studs 19. Rotatably mounted upon the end members of frame 10 at a distance from bearings 12 and 13 is a link member 20, on the upper free end of which is pivotally mounted, intermediate its ends, a locking lever or pawl 21 the upper end of which is adapted for engaging one of the teeth 15 to prevent rotation of drums 17 and 18 and shaft 14 with its scraper blades 15. It will be noticed that the pivotal connection between link 20 and pawl 21 is so constructed and arranged that when in their normal operative positions said connection will be slightly past a center line extending from the center of the lower end of link 20 to the outer end of the tooth 19 to prevent the pressure from said tooth causing said pawl to move away therefrom and accidentally release said drums. The lower end of pawl 21 terminates in an eye 22 in which is loosely mounted one end of a connecting rod 23. The other end of rod 23 terminates in an eye 24. A rocking lever 25 is loosely mounted in bearings 26 and 27, mounted near each end of cross bar 11 of frame 6 and has its ends bent to extend upwardly a short distance and then inwardly towards each other and upon these inwardly turned ends are mounted the eyes 24 of connecting rod 23. An operating handle 28 is provided about centrally of the length of rocking lever 25 and provides means for rocking the same manually when desired. Secured upon the inner sides of brace members 30 and 31 of frame 6 are plates 32 and 33 which serve to guide frame 10 during its up and down movements. Pivotally mounted at one end upon the rear cross member 34 of frame 6 is an adjusting lever 35 by means of which the frame 10 is raised or lowered according to the contour of the ground being worked. Lever 35 extends upward and forwardly from member 34 and has adjustably mounted thereon a connecting member 36 which member 36 extends transversely of said adjusting member 35 and has its ends pivotally mounted in bearings 37 and 38 secured to the upper ends of bearings 12 and 13, of shaft 14. Secured to the underside of frame 6 near the ends of cross member 11 are flat springs 39, preferably composed of a plurality of leaves, the free ends of which extend under and bear against the under sides of the side members of frame 10 and are of sufficient power to balance the weight of frame 10 and its component parts. Pivotally connected to the sides of frame 10 near the rear ends thereof are the ends of the draw frame 40 which extend forwardly and inwardly towards each other and terminate in a clevis 41, by means of which the device is connected to the propelling means (not shown) but preferably a tractor. A similar clevis 42 is secured to the forward termination of frame 6 and is slotted and serves to hold said frame 6 parallel with the ground.

By this construction it will be seen that the device is propelled by the frame 10 and draw frame 40 the object of which will be hereafter explained. A coiled spring 44 is provided to hold pawl 21 normally in contact with the teeth 19 of drums 17 and 18. While I have shown and described my device as being adapted for operation with a tractor as the propelling means, it will be easily seen that the same may be easily adapted for operation by horse or other animal power without any material alteration.

In the operation of my device the parts will be in the positions shown, it being understood that sufficient pressure is being exerted by the operator upon the free end of adjusting lever 35 to hold frame 10 in contact with the ground against the action of springs 39, greater or less pressure being exerted according to the amount of material it is desired to move.

Should it be desired to dump a portion of the load or spread a portion of it, or all of it the lever 35 is raised the required amount to allow the load to escape in the desired amounts. Should it be desired to dump the entire load, handle 28 will be used to rock rocking member 25 which will cause the pawl 21 and link 20 to assume the position shown in Fig. 4 until the drums have rotated sufficiently to move the tooth then in engagement with said pawl out of the way. Lever 28 is then released and spring 44 will return said link and pawl to their normal positions to engage the next successive tooth 19 and hold drums 17 and 18 against further rotation until said lever 28 is again operated.

Having described my invention what I claim is:

1. In a scraper a main frame provided with a wheel at each side thereof; a scraper frame pivotally mounted at its forward ends in said main frame; a plurality of scraper blades carried by said scraper frame and revoluble therein; means to hold any one of said blades in an operative position, and means to release said last means.

2. In a land scraper a main frame provided with revoluble means for supporting the same at a predetermined distance above the ground and being adapted at its forward end for connection to a supporting means; a scraper frame pivotally mounted within said main frame to oscillate vertically; a plurality of scraper blades revolubly mounted in said scraper frame; a connection from said scraper frame to a propelling means; means carried by said main frame for oscillating said scraper frame; means to hold said scraper blades against rotation; and means to render said last means inoperative.

3. In a land scraper a main frame provided with revoluble means for supporting the rear end thereof and at its opposite end being adapted for connection to a supporting means a scraper frame mounted within said main frame adapted to be moved vertically; one or more scraper blades revolubly mounted in said scraper frame; means to connect said scraper frame to a propelling means; means to hold said scraper blades against rotation; means to move said scraper frame vertically; and means to render said scraper holding means inoperative.

4. In a scraper a main frame; a scraper frame pivotally mounted at one end within said main frame adapted to have its free end moved vertically; one or more scraper blades revolubly mounted within said scraper frame; means to move the free end of said scraper frame vertically; means to lock said scraper blades against rotation; and means to release said last means.

5. A land scraper comprising a main frame; supporting wheels revolubly mounted at each side of said frame; a scraper frame pivotally mounted at one end in said main frame and movable vertically; one or more scraper blades carried by said scraper frame and revoluble therein; means between said scraper blades and said scraper frame for holding said scraper blades against rotation; means to release said last means; and means between said main and scraper frames for determining the relative positions of said main and scraper frames vertically.

6. A land scraper comprising a main frame; a scraper frame carried by said main frame and being capable of movement vertically; means to control the vertical movement of said scraper frame; scraper blades carried by said scraper frame and being capable of rotation therein; means to hold said scraper blades against rotation; and means to release said last means.

7. A land scraper comprising a main frame; a scraper frame pivotally mounted at one end in said main frame to move vertically; means to control the vertical movement of said scraper frame; scraper blades carried by said scraper frame and revoluble therein; means to permit a partial rotation of said scraper blades; means to hold said scraper blades against rotation; and means to release said last means.

8. A land scraper comprising a main frame; a scraper frame carried by said main frame and being capable of movement vertically; scraper blades carried by said scraper frame and being capable of rotation therein; means to hold said scraper blades against rotation; and means to release said last means.

9. A land scraper comprising a substantially rectangular main frame; supporting wheels revolubly mounted at each end of said main frame adapted to support said frame a predetermined distance above the ground; means to connect said frame to a propelling means; a substantially rectangular scraper frame mounted within said main frame having one end pivotally connected to said main frame and having its free end adapted for movement vertically relative to said main frame; a plurality of scraper blades revolubly mounted in said scraper frame and movable therewith vertically; means carried by said scraper blades to limit the rotation thereof; means carried by said main frame adapted to engage said last means; and manually operated means to release said last means.

In witness that I claim the foregoing I have hereunto subscribed my name this 27th day of June 1921.

WILLIAM P. MATTHEWS.